(12) United States Patent
Giri et al.

(10) Patent No.: US 11,645,584 B2
(45) Date of Patent: May 9, 2023

(54) METHOD AND SYSTEM FOR PROVIDING PERSONALIZED PRESEARCH FOR USERS OF A DATA MANAGEMENT SYSTEM

(71) Applicant: Intuit Inc., Mountain View, CA (US)

(72) Inventors: Sirigiri Venkata Giri, Bangalore (IN); Govinda Raj Sambamurthy, Bangalore (IN); Charu Garg, New Delhi (IN); Samar Ranjan, Bangalore (IN); Anshika Pandita, Bangalore (IN); Manish Jain, Bangalore (IN); Anand Patil, Bangalore (IN); Satyajit Nath Bhowmik, Bengaluru (IN)

(73) Assignee: Intuit Inc., Mountain View, CA (US)

( * ) Notice: Subject to any disclaimer, the term of this patent is extended or adjusted under 35 U.S.C. 154(b) by 13 days.

(21) Appl. No.: 17/397,736

(22) Filed: Aug. 9, 2021

(65) Prior Publication Data
US 2021/0365839 A1    Nov. 25, 2021

Related U.S. Application Data

(63) Continuation of application No. 15/987,528, filed on May 23, 2018, now Pat. No. 11,138,519.

(51) Int. Cl.
*G06F 3/048* (2013.01)
*G06N 20/00* (2019.01)
*G06F 16/2457* (2019.01)

(52) U.S. Cl.
CPC ....... *G06N 20/00* (2019.01); *G06F 16/24578* (2019.01)

(58) Field of Classification Search
CPC .......................... G06F 16/24578; G06N 20/00
See application file for complete search history.

(56) References Cited

U.S. PATENT DOCUMENTS

| | | | |
|---|---|---|---|
| 8,468,143 B1* | 6/2013 | Oztekin | G06F 16/90335 707/706 |
| 10,440,325 B1* | 10/2019 | Boxwell | H04N 5/445 |
| 10,552,843 B1* | 2/2020 | Podgorny | H04L 67/306 |
| 10,630,673 B1* | 4/2020 | Lingampally | G06F 21/41 |
| 10,671,759 B2* | 6/2020 | Sehgal | G06F 16/24578 |
| 10,922,367 B2* | 2/2021 | Podgorny | G06N 20/00 |
| 10,984,446 B1* | 4/2021 | Becker | G06N 20/00 |
| 11,127,081 B1* | 9/2021 | Kullman | G06Q 30/0201 |
| 2013/0282713 A1* | 10/2013 | Lawrence | G06F 16/24578 707/732 |

(Continued)

*Primary Examiner* — Rashawn N Tillery
(74) *Attorney, Agent, or Firm* — Paradice & Li LLP

(57) ABSTRACT

Systems and methods for identifying recommended topics are disclosed. An example method may be performed by one or more processors of a system and include identifying one or more attributes of a system user, identifying a subset of topics relevant to the system user based on analyzing the one or more attributes of the system user using an analysis model trained with a machine learning process to identify relevant topics for system users based on historical user attributes, generating, for each respective topic of the subset of topics, using the trained analysis model, a relevance score for the respective topic based at least in part on a most recent system page previously accessed by the system user and a current system page accessed by the system user, and generating one or more recommended topics for the system user based on the relevance scores.

20 Claims, 6 Drawing Sheets

(56) References Cited

U.S. PATENT DOCUMENTS

| | | | |
|---|---|---|---|
| 2014/0316850 A1* | 10/2014 | Peechara | G06Q 30/0282 |
| | | | 705/7.29 |
| 2014/0317104 A1* | 10/2014 | Isaacs | G06F 16/332 |
| | | | 707/728 |
| 2015/0170049 A1* | 6/2015 | Mann | G06N 5/04 |
| | | | 706/12 |
| 2017/0124184 A1* | 5/2017 | Podgorny | G06Q 30/016 |
| 2017/0262447 A1* | 9/2017 | Paulsen | H04L 67/12 |
| 2017/0344609 A1* | 11/2017 | Wadley | G06F 16/24578 |
| 2018/0032890 A1* | 2/2018 | Podgorny | G06N 7/005 |
| 2018/0063265 A1* | 3/2018 | Crossley | G06N 5/02 |
| 2018/0157740 A1* | 6/2018 | Chovel | G06F 16/334 |
| 2019/0188326 A1* | 6/2019 | Daianu | G06F 9/453 |
| 2019/0370029 A1* | 12/2019 | Agnoli | G06F 3/048 |
| 2020/0074871 A1* | 3/2020 | Zhou | G09B 5/00 |
| 2022/0284319 A1* | 9/2022 | Chen | G06F 16/906 |

\* cited by examiner

300

METHOD AND SYSTEM FOR PROVIDING PERSONALIZED PRESEARCH FOR USERS OF A DATA MANAGEMENT SYSTEM

CROSS-REFERENCE TO RELATED APPLICATION

This patent application is a continuation of, and claims priority to, U.S. patent application Ser. No. 15/987,528 entitled "METHOD AND SYSTEM FOR PROVIDING PERSONALIZED PRESEARCH FOR USERS OF A DATA MANAGEMENT SYSTEM" and filed on May 23, 2018, which is assigned to the assignee hereof. The disclosures of all prior applications are considered part of and are incorporated by reference in this patent application.

TECHNICAL FIELD

This disclosure relates generally to personalizing presearch, and specifically to providing personalized presearch for users of a data management system.

BACKGROUND

Millions of people turn to electronic data management systems for assistance in managing various kinds of data. Electronic data management systems represent a potentially efficient and convenient way to manage data of many kinds. For example, millions of people turn to data management systems for assistance with tax return preparation, bookkeeping, accounting, and transaction monitoring.

Users of data management systems often develop questions regarding data management topics or regarding features of the data management systems or related to data management topics. Accordingly, many traditional data management systems retain a library of assistance documents related to various assistance topics. Typically, users access the assistance documents to obtain help related to various topics while using the data management systems.

Some traditional data management systems provide recommended assistance topics with the various data management pages as the user navigates through the services of the data management systems. The users can see the recommended assistance topics and can select them in order to access assistance documents associated with the recommended assistance topics. In this way, if a user sees an assistance topic that is relevant to the user, the user can access assistance related to the topic even before the user has made a search for assistance. This can reduce the rate at which users access search features of the data management systems.

However, for a given data management page, traditional data management systems typically recommend the same assistance topics to all users. Because the assistance topics are the same for all users, many users receive assistance topic recommendations that are irrelevant to them. When users receive assistance topic recommendations that are irrelevant to them, the users do not select any of the recommended assistance topics and are, therefore, not helped at all.

When users do not receive relevant assistance topic recommendations, both the data management system and the users can face adverse consequences. Some users may become frustrated and confused and may abandon the data management system. Other users may access a search feature of the data management system, thereby causing the data management systems to spend large amounts of computing resources, such as processor cycles, memory, and time performing searches for assistance topics based on the search terms entered by the users. Still other users may decide to make a telephone call to the data management system and speak with an expert in a process that can be very expensive and time consuming to both the data management system operators and to the users.

All of these drawbacks are a result of the technical inability of the traditional data management systems to properly understand the individual needs of the users. Accordingly, there exists a technical problem of correctly understanding the individual needs of users and providing them with personalized assistance topics recommendations. What is needed is a system and method that can provide a technical solution to the technical problem of accurately identifying the assistance needs of users of data management systems.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for identifying recommended topics. The method may be performed by one or more processors of a system. An example method may include identifying one or more attributes of a system user, identifying a subset of topics relevant to the system user based on analyzing the one or more attributes of the system user using an analysis model trained with a machine learning process to identify relevant topics for system users based on historical user attributes, generating, for each respective topic of the subset of topics, using the trained analysis model, a relevance score for the respective topic based at least in part on a most recent system page previously accessed by the system user and a current system page accessed by the system user, and generating one or more recommended topics for the system user based on the relevance scores.

In some implementations, the method may further include maintaining a topics database including a set of topics for assisting system users, where each topic of the subset of topics is included within the set of topics. In some aspects, identifying the subset of topics is further based on analyzing the most recent system page and the current system page using the trained analysis model. In some other aspects, identifying the subset of topics is further based on analyzing clickstream data indicating system pages recently accessed by the system user.

In some other implementations, the one or more recommended topics include a set of highest scoring topics among the subset of topics having the highest relevance scores, and the method may further include providing the one or more recommended topics to the system user on the current system page. In some aspects, the one or more attributes of the system user include at least one of an industry code associated with the system user, a language of the system user, a country associated with the system user, or a length of time that the system user has been associated with the system. In some other aspects, the analysis model includes at least one of a naïve Bayes model, a logistic regression model, a decision tree model, or a K nearest neighbors model.

In some implementations, generating the relevance score is further based on a time-based depreciation factor indicating a recency with which other users have accessed the respective topic. In some instances, the time-based depreciation factor depreciates the relevance score for the respective topic by a particular percentage for each of a plurality of time periods based on at least one of a geometric depreciation method, an arithmetic depreciation method, or a linear depreciation method. In some other implementations, the method may further include training the analysis model based on the historical user attributes.

Another innovative aspect of the subject matter described in this disclosure can be implemented in a system for identifying recommended topics. An example system may include one or more processors and a memory storing instructions for execution by the one or more processors. Execution of the instructions may cause the system to perform operations including identifying one or more attributes of a system user, identifying a subset of topics relevant to the system user based on analyzing the one or more attributes of the system user using an analysis model trained with a machine learning process to identify relevant topics for system users based on historical user attributes, generating, for each respective topic of the subset of topics, using the trained analysis model, a relevance score for the respective topic based at least in part on a most recent system page previously accessed by the system user and a current system page accessed by the system user, and generating one or more recommended topics for the system user based on the relevance scores.

In some implementations, execution of the instructions may further cause the system to perform operations including maintaining a topics database including a set of topics for assisting system users, where each topic of the subset of topics is included within the set of topics. In some aspects, identifying the subset of topics is further based on analyzing the most recent system page and the current system page using the trained analysis model. In some other aspects, identifying the subset of topics is further based on analyzing clickstream data indicating system pages recently accessed by the system user.

In some other implementations, the one or more recommended topics include a set of highest scoring topics among the subset of topics having the highest relevance scores, and execution of the instructions may further cause the system to perform operations including providing the one or more recommended topics to the system user on the current system page. In some aspects, the one or more attributes of the system user include at least one of an industry code associated with the system user, a language of the system user, a country associated with the system user, or a length of time that the system user has been associated with the system. In some other aspects, the analysis model includes at least one of a naïve Bayes model, a logistic regression model, a decision tree model, or a K nearest neighbors model.

In some implementations, generating the relevance score is further based on a time-based depreciation factor indicating a recency with which other users have accessed the respective topic. In some instances, the time-based depreciation factor depreciates the relevance score for the respective topic by a particular percentage for each of a plurality of time periods based on at least one of a geometric depreciation method, an arithmetic depreciation method, or a linear depreciation method. In some other implementations, execution of the instructions may further cause the system to perform operations including training the analysis model based on the historical user attributes.

Another innovative aspect of the subject matter described in this disclosure can be implemented as a non-transitory computer-readable medium storing instructions that, when executed by one or more processors of a system for identifying recommended topics, cause the system to perform operations. Example operations may include identifying one or more attributes of a system user, identifying a subset of topics relevant to the system user based on analyzing the one or more attributes of the system user using an analysis model trained with a machine learning process to identify relevant topics for system users based on historical user attributes, generating, for each respective topic of the subset of topics, using the trained analysis model, a relevance score for the respective topic based at least in part on a most recent system page previously accessed by the system user and a current system page accessed by the system user, and generating one or more recommended topics for the system user based on the relevance scores.

In some implementations, embodiments of the present disclosure provide one or more technical solutions to the technical problem of correctly understanding the individual assistance needs of users of data management systems and efficiently and effectively providing real time accurate assistance topic recommendations to users of data management systems. In some aspects, embodiments of the present disclosure train an analysis model with a machine learning process to identify assistance topics that are likely to be relevant to a user based on the attributes of the user, the data management page currently accessed by the user, one or more data management pages previously accessed by the user, and the recency with which other users have accessed various assistance topics.

In some other implementations, when a user accesses a page or screen of the data management system, the analysis model identifies a set of assistance topics mostly likely to be relevant to the user. The data management system then provides personalized assistance document recommendation data to the user in the current data management page by recommending the assistance topics most likely to be relevant to the user based on the analysis model.

In some implementations, embodiments of the present disclosure address some of the shortcomings associated with traditional data management systems. A data management system in accordance with embodiments of the present disclosure may utilize machine learning processes in order to provide personalized assistance topic recommendations to users. The various embodiments of the disclosure may be implemented to improve the technical fields of electronic data management, data processing, data transmission, and data storage. Therefore, the various described embodiments of the disclosure and their associated benefits amount to significantly more than an abstract idea. In particular, by providing accurate and personalized assistance to users, electronic data management is significantly improved.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale. One skilled in the art will readily recognize that the below figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs, which depict one or more exemplary embodiments. Embodiments may be implemented in many different forms and should not be construed as limited to the embodiments set forth herein, shown in the FIGs, and/or described below. Rather, these exemplary embodiments are provided to allow a complete disclosure that conveys the principles of the invention, as set forth in the claims, to those of skill in the art.

Using the disclosed embodiments of a method and system for accurately identifying the needs of users of a data management system, a method and system for accurately identifying the needs of users of a data management system more accurately is provided. Therefore, the disclosed embodiments provide a technical solution to the long standing technical problem of correctly identifying the individual needs of users and providing personalized assistance to users of data management systems.

The disclosed embodiments of a method and system for accurately identifying the needs of users of a data management system are also capable of dynamically adapting to constantly changing fields such as data managements systems. Consequently, the disclosed embodiments of a method and system for accurately identifying the needs of users of a data management system also provide a technical solution to the long standing technical problem of static and inflexible data management systems.

The result is a much more accurate, adaptable, and robust method and system for accurately identifying the needs of users of a data management system. This, in turn, results in less human and processor resources being dedicated to providing assistance topics recommendations and to providing search and human customer service functionality. Thus, embodiments of the present disclosure lead to the usage of fewer processing resources, usage of fewer memory storage assets, and less communication bandwidth being utilized to transmit data for analysis.

The disclosed method and system for accurately identifying the needs of users of a data management system does not encompass, embody, or preclude other forms of innovation in the area of data management. In addition, the disclosed method and system for accurately identifying the needs of users of a data management system is not related to any fundamental economic practice, fundamental data processing practice, mental steps, or pen and paper-based solutions, and is, in fact, directed to providing solutions to new and existing problems associated with data management systems. Consequently, the disclosed method and system for accurately identifying the needs of users of a data management system, does not encompass, and is not merely, an abstract idea or concept.

Figure 1:
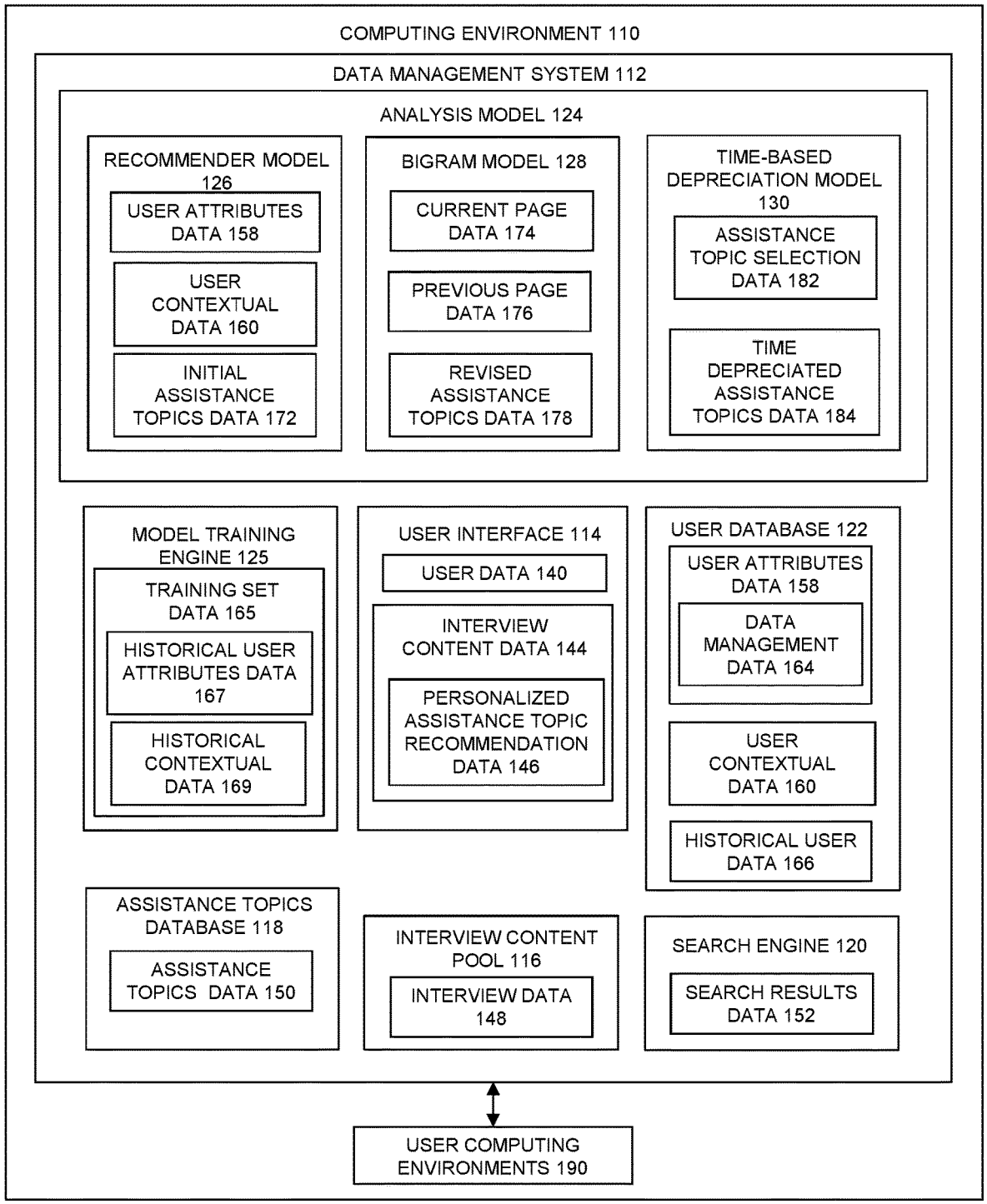
FIG. 1 is a block diagram of software architecture for accurately identifying the needs of users of a data management system, in accordance with one embodiment.

FIG. 1 illustrates a block diagram of a production environment 100 for accurately identifying the needs of users of a data management system, according to one embodiment. In some implementations, embodiments of the present disclosure train an analysis model with a machine learning process to identify assistance topics that are likely to be relevant to a user based on the attributes of the user, the data management page currently accessed by the user, one or more data management pages previously accessed by the user, and the recency with which other users have accessed various assistance topics. When a user accesses a page or screen of the data management system, the analysis model identifies a set of assistance topics likely to be relevant to the user based on the attributes of the user and contextual data related to the user. The analysis model then revises the calculated relevance of each assistance topic in the set of assistance topics based on the page currently being accessed by the user and based on one or more pages previously accessed by the user. The analysis model then applies a time-based depreciation model that depreciates the relevance of the assistance topics based on how recently users have selected the assistance topics. The analysis model then identifies the most relevant assistance topics. The data management system provides, to the user, personalized assistance topic recommendation data that includes recommendations for the assistance topics that are most likely to be relevant to the user based on the analysis model.

In one embodiment, the data management system retrieves or retains historical user data related to historical users of the data management system. The historical user data includes historical user attributes data corresponding to attributes of the historical users. The historical user data also includes historical contextual data related to how the historical users utilized the data management system. The historical user data also includes data indicating assistance topics accessed by the historical users.

In one embodiment, the data management system trains the analysis model with a supervised machine learning process. The data management system generates training set data from the historical user data. The data management system utilizes the training set data to train the analysis model to identify relevant assistance topics for users based on user attributes data and user contextual data. The machine learning process trains the analysis model with the training set data to reproduce the assistance topics selected by the historical users based on the historical user attributes data and the historical contextual data.

In one embodiment, the analysis model includes a naïve Bayes model. When a user accesses a particular page of the data management system, the naïve Bayes model receives user attributes data and user contextual data and identifies a set of assistance documents likely to be relevant to the user based on the user attributes data and the user contextual data.

Alternatively, or additionally, in various embodiments the analysis model includes one or more of a logistic regression model, a decision tree model, the K nearest neighbors model, or other predictive models.

In one embodiment, the data management system trains the analysis model with an unsupervised machine learning process to identify assistance topics that are likely relevant to a user. In one embodiment, the data management system trains the analysis model with an unsupervised deep learning machine learning process to identify assistance topics that are likely relevant to a user query.

In one embodiment, the analysis model includes a bigram model. After the analysis model has identified an initial set of assistance topics likely to be relevant to the user, the bigram model refines a relevance score of each assistance topic in the initial set of assistance topics based on both the current data management page accessed by the user and one or more previous data management pages most recently accessed by the user. The bigram model enhances the accuracy of the relevance score of each assistance topic based on the one or data management pages most recently accessed by the user prior to the current data management page.

In one embodiment, the analysis model includes a time-based depreciation model. The time-based depreciation model receives the revised assistance topics data from the bigram model. The time-based depreciation model also receives assistance topics selection data indicating, for each assistance topic in the revised assistance topics data, how often the assistance topic has been selected both recently and in the past. The time-based depreciation model reduces the relevance score of assistance topics that have not been selected recently by users of the data management system. Thus, an assistance topic that was accessed a given number of times (e.g., six months ago) will be depreciated relative to an assistance topic that has been accessed the same number of times but in a previous month. The time-based depreciation model generates personalized assistance topic recommendation data recommending a selected number of the assistance topics that have the highest relevance score after time-based depreciation has been performed. The data management system then provides the personalized assistance topic recommendation data to the user on the data management page that the user is currently visiting.

In one embodiment, the analysis model includes multiple analysis sub models. In one embodiment, the analysis model utilizes two or more of the sub models in identifying relevant assistance topics. In one embodiment, the analysis model utilizes only a single sub model in identifying relevant assistance topics. In one embodiment, each sub model can be considered a separate analysis model.

In addition, the disclosed method and system for accurately identifying the needs of users of a data management system provides for significant improvements to the technical fields of data management, data processing, and data transmission.

In addition, as discussed above, the disclosed method and system for accurately identifying the needs of users of a data management system provides for the processing and storage of smaller amounts of data related to providing assistance to the users. Because relevant assistance topics are identified efficiently, fewer system resources are devoted to performing additional searches or to connecting a user with a data management expert. Consequently, using the disclosed method and system for accurately identifying the needs of users of a data management system results in more efficient use of human and non-human resources, fewer processor cycles being utilized, reduced memory utilization, and less communications bandwidth being utilized to relay data to, and from, backend systems and client systems, and various systems and parties. As a result, computing systems are transformed into faster, more efficient, and more effective computing systems by implementing the method and system for accurately identifying the needs of users of a data management system.

As seen in FIG. 1, the production environment 100 includes a computing environment 110. The computing environment 110 represents one or more computing systems such as a server, and/or distribution center that is configured to receive, execute, and host one or more data storage and access systems, according to one embodiment. The computing environment 110 represents a traditional data center computing environment, a virtual asset computing environment (e.g., a cloud computing environment), or a hybrid between a traditional data center computing environment and a virtual asset computing environment, according to various embodiments.

In one embodiment, the computing environment 110 includes a data management system 112. The data management system 112 can include a user interface 114, an interview content pool 116, an assistance topics database 118, a search engine 120, a user database 122, an analysis model 124, and a model training engine 125, according to various embodiments. The analysis model 124 can include a recommender model 126, a bigram model 128, and a time-based depreciation model 130, according to various embodiments.

In one embodiment, the data management system 112 is an electronic data management system that assists users to manage their data. In one embodiment, the data management system 112 is a financial management system. The financial management system can include one or more of a bookkeeping system, a tax return preparation system, an accounting system, and a financial transaction monitoring system, according to various embodiments. In one embodiment, users provide their financial data to the financial management system and the financial management system provides financial management services to the users.

In one embodiment, the data management system 112 utilizes the user interface 114 to enable the users of the data management system 112 to interact with the data management system 112. The user interface 114 enables users to access the data management services of the data management system 112. The user interface 114 enables users to provide data and instructions to the data management system 112. The user interface 114 enables the data management system 112 to provide data to the users in conjunction with the data management services provided by the data management system 112.

In one embodiment, the user interface 114 enables the data management system 112 to interface with user computing environments 190. The user computing environments 190 include computing environments utilized by users of the data management system 112. The user computing environments include one or more of desktop computing devices, mobile phone computing devices, tablet computing devices, laptop computing devices, and cloud-based computing devices. The user computing environments 190 include computing environments utilized by users of the data management system 112 to access the data management services of the data management system 112. The user computing environments 190 access the data management system 112 via the user interface 114 in order to provide data to the data management system 112 and to receive data from the data management system 112.

In one embodiment, one or more components of the data management system 112, or portions of one or more components of the data management system 112, are implemented in the user computing environments 190. Thus, in one embodiment, some of the processing, software, and memory resources associated with functionality of the data management system 112 are implemented in the user computing environments 190.

In one embodiment, users of the data management system 112 receive a data management interview from the data management system 112 via the user interface 114. Users provide user data 140 to the data management system 112 via the user interface 114. The data management system 112 provides interview content data 144 to the users via the user interface 114. The user data 140 can include personal information related to the user, demographics data related to the user, and data that the user wishes to be managed by the data management system 112. The user may provide user data 140 in response to questions posed by the data management system 112 during the data management interview. In an example in which the data management system 112 is a financial management system, the user data 140 can include financial data of the user related to the financial management services provided by the financial management system.

In one embodiment, the data management system 112 includes an interview content pool 116. The interview content pool 116 includes interview data 148. The interview data 148 guides a user through a series of data management topics, asks questions, and invites the user to provide data related to data management topics and questions. The user interface 114 populates the interview content data 144 from the interview data 148. The interview content pool 116 includes topics, questions, and user experience elements that can be presented to the user during the data management interview. Additionally, or alternatively, the interview content pool includes a plurality of data management pages through which the user can navigate in order to access desired services of the data management system 112. Accordingly, the interview content data 144 can include data management page data corresponding to the data management page currently being accessed by the user, according to one embodiment.

In one embodiment, the interview data 148 includes a large number of data management pages which can be accessed by and/or presented to users with the interview content data 144 as part of the data management interview. The users can make selections to navigate through the various data management pages during the data management interview. In one embodiment, the interview data 148 associates, with each data management page, a respective identification number. In one embodiment, the interview data 148 associates various data management topics with each data management page in accordance with the content of the data management page.

In one embodiment, the data management system 112 presents, with the interview content data 144, personalized assistance topic recommendation data 146. While the user is accessing a selected data management page, the data management system 112 can present, on the current data management page, the personalized assistance topic recommendation data 146 including recommendations for one or more relevant assistance topics likely to be relevant to the user. The personalized assistance topic recommendation data 146 can be presented in a location within the presented data management page such as, but not limited to, in line with presented data management data, to the side of presented data management data, above presented data management data, or below presented data management data. The personalized assistance topic recommendation data 146 can include links to each of the recommended assistance topics such that a user can select a link and access the assistance topic, or an assistance document associated with the assistance topic.

In one embodiment, the data management system 112 includes a user database 122. The user database 122 includes user attributes data 158 associated with each user of the data management system 112. The user attributes data 158 includes the various kinds of data collected by the data management system 112 and related to the users. In one embodiment, the personal attributes data may include one or more of a language associated with the user, an industry code associated with the user, a length of time that the user has been a customer of the data management system 112, an age of a business associated with the user, or another appropriate personal attribute associated with the user. The industry codes can include industry codes such as North American Industry Classification System (NAICS) industry codes or other region-based industry codes.

In one embodiment, the user attributes data 158 includes demographics data. The demographics data includes data indicating the demographics of each user. In one embodiment, the demographics data includes, for each user, an age range of the user, a gender of the user, a geolocation of the user, marital status information of the user, parental information of the user, and other kinds of personal demographics data related to the user.

In one embodiment, the user attributes data 158 includes data management data 164. The data management data 164 includes data received from the user, or related to the user, for data management purposes. In an example in which the data management system 112 is a bookkeeping system, the data management data 164 includes bookkeeping data of the user. The bookkeeping data can include data related to each bookkeeping account or category, as well as templates or documents created by or for the user. In an example in which the data management system 112 is a tax return preparation system, the data management data 164 can include tax related data provided by the user, such as W-2 information, income information, investment information, charitable donations, work-related deductions, and other kinds of tax related data that can be collected from or related to the user for purposes of preparing a tax return for the user. Accordingly, the data management data 164 includes the type of data provided by the user for receiving data management services from the data management system 112. In one embodiment, there is overlap between the data management data 164 and the user attributes data 158 such that the data management data 164 can include demographics data related to the user.

In one embodiment, the user database 122 includes user contextual data 160. The user contextual data can include data indicating which data management products associated with the data management system 112 are accessed or subscribed to by each user. In one embodiment, the user contextual data 160 includes clickstream data. The clickstream data indicates how the user has navigated the services provided by the data management system. The clickstream data can include data indicating which data management pages the user has accessed during the data management interview or while the user has been accessing the services of the data management system 112. The clickstream data can include a list of identification numbers for each data management page that the user has accessed. In one embodiment, the clickstream data can include one or more of data indicating how long a user remained on each data management page, selections made by the user in the various data management pages, advertisements to which the user was exposed, advertisements that the user investigated, which data management pages the user has most recently visited, assistance topics accessed by the user, or other appropriate behavioral data indicating actions that the user undertook in relation to the data management interview. In one embodiment, the user contextual data 160 includes an identification of the data management page currently being accessed by a user, and one or more of the most recent data management pages previously accessed by the user.

In one embodiment, the user database 122 includes historical user data 166. The historical user data 166 includes data management data associated with historical users of the data management system 112. The historical user data 166 can include the same types of data included in the user attributes data 158 for historical users of the data management system 112. In one embodiment, the historical user data 166 includes data related to current users of the data management system 112.

In one embodiment, the data management system 112 includes an assistance topics database 118. The assistance topics database 118 includes assistance topics data 150. In one embodiment, the assistance topics data 150 includes a plurality of assistance documents. The assistance documents include assistance topics as well as solutions to problems related to the assistance topics. Each assistance document corresponds to an assistance topic with one or more solutions or answers related to the assistance topic.

In one embodiment, the assistance topics database 118 is a social question-and-answer database. In a social question-and-answer database, each assistance document corresponds to a question or query provided by a user of the data management system 112. In the social question-and-answer database, the answers or solutions to a query made by a user are provided by other users of the data management system 112. A single assistance document can include multiple answers or solutions provided by various users of the social question-and-answer support system.

In one embodiment, an assistance document includes answers provided by regular users of the data management system 112, or by users that have been designated as trusted users of the data management system 112. Furthermore, in one embodiment, an assistance document includes answers provided by experts or other personnel associated with the data management system 112.

In one embodiment, each assistance document includes feedback data based on feedback provided by users of the data management system 112 that have viewed the assistance document. In one embodiment, the assistance document includes functionality that enables users of the data management system 112 to provide feedback related to the query associated with the assistance document and related to the answers provided by the various users of the data management system 112 that have accessed the assistance document. For example, users of the data management system 112 that access an assistance document may be invited to identify, for each answer provided, whether the answer was helpful or unhelpful. Thus, each answer can have both positive and negative feedback from users of the data management system 112 that have viewed the assistance document associated with the answers. In one embodiment, the feedback data includes feedback for the query and feedback for the answers. In one embodiment, the feedback for each item in the assistance document includes positive feedback such as a thumbs-up, a confirmation that the question or answer was helpful, or other kinds of positive feedback. In one embodiment, the feedback for each item in the assistance document includes negative feedback such as a thumbs down or an assertion that the answer was unhelpful. Feedback can include structured feedback such as upvotes, downvotes, some number of stars, and so on. Feedback can also include unstructured feedback such as text comments added by the users in addition to the votes to give the rationale for the votes.

In one embodiment, each assistance document from the assistance topics data includes a query. The query corresponds to the search query provided by the user that originally generated the assistance document. The query can include a question, a full statement, or one or more search terms. Thus, the query can include full sentences, sentence fragments, or even an individual word or two. Furthermore, sentences can be grammatically correct or incorrect, can include or not include punctuation marks, can be well formulated or poorly formulated, or have other characteristics that may differentiate assistance documents in terms of quality or intent.

In one embodiment, each assistance document from the assistance topics data 150 includes answer data. The answer data includes the answers or solutions provided by users, trusted users, or personnel associated with the data management system 112. An assistance document may include a single answer, multiple answers, or no answer at all. An assistance document can also include optional comments. In addition, an assistance document may have a comment but no answers.

In one embodiment, the data management system 112 includes a search engine 120 to assist in providing personalized assistance topic recommendation data 146 to users in response to receiving search requests from the users. In particular, when the user provides search request data, the search engine 120 performs a search of the assistance topics database 118 in order to identify assistance documents that are relevant to the search request data. As will be set forth in more detail below, in one embodiment, the search engine 120 cooperates with the analysis model 124 to identify assistance documents that are relevant to the user based on the user attributes data 158 and the search request data.

In one embodiment, the search engine 120 generates search results data 152 in response to the search request data and in cooperation with the analysis model 124. In one embodiment, the search results data 152 includes one or more assistance documents, or links to one or more assistance documents, likely to be relevant to the user based on the search request data and the user attributes data 158.

In one embodiment, in order to spare a given user from needing to access the search engine 120 each time the given user accesses the data management page, the data management system 112 identifies assistance topics that are likely to be relevant to the given user and provides personalized assistance topic recommendation data 146 to the given user. If one of the assistance topics indicated by the personalized assistance topic recommendation data 146 is relevant to a question that the given user has, the given user can select the assistance topic from the personalized assistance topic recommendation data 146. This alleviates the need of the given user to access the search engine 120, or to access the data management expert.

As set forth previously, traditional data management systems recommend a static set of assistance topics on various data management pages. Typically, the static set of assistance topics is based, at best, solely on the current data management page. However, it has been empirically determined by the inventors that when users search for help, they typically do not access the search feature from a page related to the users' questions. Instead, users return to the homepage and then access the search feature, or the users proceed to access various pages and ask a question related to a previously visited page. Accordingly, traditional data management systems typically do not offer relevant assistance topics to users.

To alleviate this long standing technical problem, in one embodiment, the data management system 112 utilizes the analysis model 124 to assist in providing personalized assistance topic recommendation data 146 to users of the data management system 112 each time the users access a data management page of the data management system 112. The analysis model 124 generates personalized assistance topic recommendation data 146 based on the user attributes data associated with the users and the user contextual data 160.

In one embodiment, the analysis model 124 is able to identify the individual needs of the users based on the user attributes data and the user contextual data 160. The analysis model 124 is able to identify and recommend personalized assistance topic recommendation data 146 for each user on each data management page. Thus, the analysis model 124 analyzes not only the current data management page, but previous data management pages, and user attributes data 158 in order to identify, with a much higher degree of accuracy than traditional data management systems, assistance topics that are likely to be relevant to the user.

In one embodiment, the data management system 112 trains the analysis model 124 with a machine learning processes to accurately identify assistance topics likely to be relevant to the user. In one embodiment, the analysis model 124 is able to execute multiple algorithms, processes, or sub-models based on one or more supervised or unsupervised machine learning processes in order to identify assistance topics that are likely to be relevant to users of the data management system 112. In one embodiment, the analysis model 124 selectively utilizes one or more available algorithms or processes based on the user attributes data 158 and the user contextual data 160. For example, the analysis model 124 may execute a first algorithm and identify an initial set of assistance documents that are likely to be relevant to a user. The analysis model 124 may then execute a second algorithm to refine relevance scores associated with each assistance topic in the initial set of assistance topics. The analysis model 124 may then execute a third algorithm to further refine the relevance scores. The analysis model may then select the most highly ranked assistance topics to be included in the personalized assistance topic recommendation data 146.

In one embodiment, the data management system 112 utilizes a model training engine 125 in order to train the analysis model 124. In particular, the model training engine 125 can train the analysis model in accordance with one or more machine learning processes. The one or more machine learning processes train the analysis model 124 to identify personalized assistance topic recommendation data 146.

In one embodiment, the analysis model 124 includes the recommender model 126. The recommender model 126 is trained to identify assistance topics that are likely to be relevant to a current user when a current user accesses a data management page of the data management system 112. The recommender model 126 receives user attributes data 158 and user contextual data 160 associated with the user. The recommender model 126 analyzes the user attributes data 158 and the user contextual data 160 and identifies assistance topics that are likely to be relevant to the user based on the analysis of the user attributes data 158 and the user contextual data 160.

In one embodiment, model training engine 125 trains the recommender model 126 with a supervised machine learning process. The model training engine 125 utilizes training set data 165 to train the recommender model 126. The training set data 165 includes historical user attributes data 167 and historical contextual data 169. The historical user attributes data 167 includes attributes data related to historical users of the data management system 112. The historical user attributes data 167 can include the same kinds of data as the user attributes data 158, but for a large number of historical users of the data management system 112. The historical contextual data 169 can include the same kinds of data as the user contextual data 160. In one embodiment, the historical user attributes data 167 and historical contextual data 169 is taken from the user attributes data 158.

In one embodiment, the historical contextual data 169 can also include data indicating how the historical users selected assistance topics. For example, many historical users have selected assistance topics from among the search results generated by the search engine 120. Many historical users have also selected assistance topics from those presented by the data management system 112 when historical users accessed various pages. The data management system utilizes this data to train the recommender model 126, according to one embodiment.

In one embodiment, the model training engine 125 utilizes the training set data 165 to train the recommender model 126 with a supervised machine learning process. The model training engine 125 utilizes the training set data 165 to train the recommender model 126 to identify relevant assistance topics for users based on user attributes data 158 and user contextual data 160. The machine learning process trains the recommender model 126 with the training set data 165 to reproduce the assistance topics selected by the historical users based on the historical user attributes data 167 and the historical contextual data 169.

In one embodiment, the recommender model 126 includes a naïve Bayes model. When a user accesses a particular page of the data management system, the naïve Bayes model receives user attributes data and user contextual data and identifies a set of assistance documents likely to be relevant to the user based on the user attributes data and the user contextual data. Alternatively, or additionally, in various embodiments the recommender model 126 includes one or more of a logistic regression model, a decision tree model, a K nearest neighbors model, or other predictive models.

In one embodiment, the recommender model 126 generates initial assistance topics data 172 by analyzing the user attributes data 158 and user contextual data 160 for a user. The initial assistance topics data 172 includes a set of assistance topics likely to be relevant to the user based on the user attributes data 158 and the user contextual data 160 in accordance with the machine learning process.

In one embodiment, the initial assistance topics data 172 includes, for each assistance topic, a relevance score that indicates the likelihood that the assistance topic will be relevant to the user. In one embodiment, the relevance score is a probability between zero and one. Alternatively, the relevance score can include numbers greater than one, negative numbers, or other kinds of scoring schemes as will be apparent to those of skill in the art in light of the present disclosure.

In one embodiment, the analysis model 124 includes a bigram model 128. The bigram model 128 receives the initial assistance topics data 172 from the recommender model 126. The bigram model 128 also receives previous page data 176 indicating the most recent data management page visited by the user prior to the current data management page. Additionally, or alternatively, the previous page data 176 can include data indicating more than one of the most recently visited data management pages. The bigram model 128 analyzes the initial assistance topics data 172 based on previous page data 176 and based on the current data management page that the user is currently accessing. The bigram model 128 generates revised assistance topics data 178. The revised assistance topics data 178 includes the assistance topics from the initial assistance topics data 172 but with revised relevant scores. The bigram model 128 revises the relevant scores based on the previous page data 176 and the current data management page data 174. The revised assistance topics data 178 includes enhanced relevance scores that are more likely to be accurate than the relevance scores indicated by the initial assistance topics data 172.

In one embodiment, the analysis model 124 includes a time-based depreciation model 130. The time-based depreciation model 130 receives the revised assistance topics data 178 as well as assistance topics selection data 182. The assistance topics selection data 182 indicates, for each assistance topic included in the revised assistance topics data 178, how many times users selected the assistance topic as well as when users selected the assistance topic. The time-based depreciation model 130 revises the relevance score for each of the assistance topics based on the assistance topic selection data 182. The time-based depreciation model 130 generates time depreciated assistance topics data 184 including the highest ranked assistance topics after revising the relevance scores based on the assistance topics selection data 182. The analysis model 124 generates the personalized assistance topic recommendation data 146 based on the time depreciated assistance topics data 184. In one embodiment, the personalized assistance topic recommendation data 146 is the time depreciated assistance topics data 184.

In one embodiment, the time-based depreciation model 130 depreciates the relevance score, or a factor included in the relevance score, in accordance with a geometric depreciation method. In the geometric depreciation method, the relevance score, or a factor contributing to the relevance score, in each time period is depreciated by a fixed percentage of its value with respect to the next most recent time period. Alternatively, the time-based depreciation model 130 depreciates the relevance score, or a factor included in calculating the relevance score, in an arithmetic or linear fashion rather than a geometric fashion.

In one embodiment, the time-based depreciation model 130 depreciates the relevance score, or a factor included in the relevance score, on a regular basis (e.g., monthly) by a depreciation value $\alpha$. For example, the weight given to an assistance topic based on the number of times an assistance topic was selected may be recomputed every month by multiplying the weight by the depreciation value $\alpha$. The depreciation value $\alpha$ can range from 0 to 1, according to one embodiment. In one embodiment, the depreciation value $\alpha$ ranges from 0.80 to 0.85 in order to avoid over fitting or under fitting.

In one example, the number of selections for the most recent previous month is multiplied by the depreciation factor $\alpha$, and the number of selections for two months ago is multiplied by $\alpha*\alpha$. Accordingly, the number of selections for any previous month is multiplied by the depreciation factor of $\alpha^n$, where n corresponds to the number of months prior. In this way, an assistance topic that was selected a large number of times several months ago will have the relevance score that is depreciated with respect to an assistance topic that was selected the same number of times in the current month. In one embodiment, the geometric depreciation method prevents the value from reaching zero.

In one embodiment, the recommender model 126, the bigram model 128, and the time-based depreciation model 130 are each sub models of the analysis model 124. In one embodiment, the analysis model 124 utilizes two or more of the sub models in identifying relevant assistance topics. In one embodiment, the analysis model 124 utilizes only a single sub model in identifying relevant assistance topics. In one embodiment, each sub model can be considered a separate analysis model.

In one embodiment, the analysis model 124 selects a fixed number of the most relevant assistance topics to be included in the personalized assistance topic recommendation data 146. For example, the analysis model 124 can select the five most relevant assistance topics to be included in the personalized assistance topic recommendation data 146.

Embodiments of the present disclosure address some of the shortcomings associated with traditional data management systems. A data management system in accordance with embodiments of the present disclosure utilizes machine learning processes in order to provide personalized assistance topic recommendations to users. The various embodiments of the disclosure can be implemented to improve the technical fields of electronic data management, data processing, data transmission, and data storage. Therefore, the various described embodiments of the disclosure and their associated benefits amount to significantly more than an abstract idea. In particular, by providing accurate and personalized assistance to users, electronic data management is significantly improved.

Figure 2:
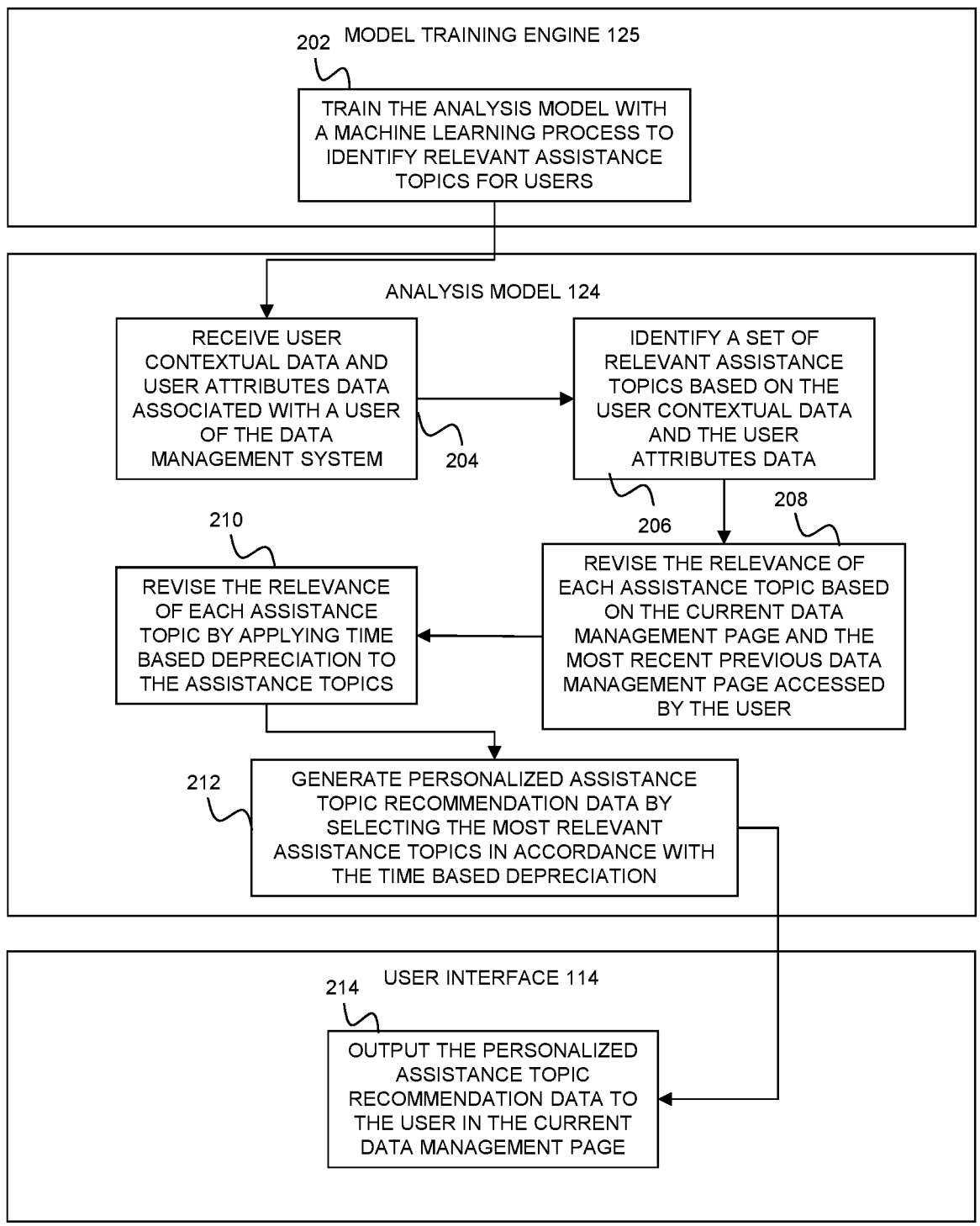
FIG. 2 is a block diagram of a process for accurately identifying the needs of users of a data management system, in accordance with one embodiment.

FIG. 2 illustrates a functional flow diagram of a process 200 for accurately identifying the needs of users of a data management system, in accordance with one embodiment.

Referring to FIG. 2, FIG. 1, and the description of FIG. 1 above, at block 202, the model training engine 125 trains the analysis model with a machine learning process to identify relevant assistance topics for users, using any of the methods, processes, and procedures discussed above with respect to FIG. 1, according to one embodiment. From block 202, the process proceeds to block 204.

At block 204, the analysis model 124 receives user contextual data and user attributes data associated with a user of the data management system, using any of the methods, processes, and procedures discussed above with respect to FIG. 1, according to one embodiment. From block 204, the process proceeds to block 206.

At block 206, the analysis model 124 identifies a set of relevant assistance topics based on the user contextual data and the user attributes data, using any of the methods, processes, and procedures discussed above with respect to FIG. 1, according to one embodiment. From block 206, the process proceeds to block 208.

At block 208, the analysis model revises the relevance of each assistance topic based on the current data management page and the most recent previous data management pages accessed by the user, using any of the methods, processes, and procedures discussed above with respect to FIG. 1, according to one embodiment. From block 208, the process proceeds to block 210.

At block 210, the analysis model 124 revises the relevance of each assistance topic by applying time-based depreciation to the assistance topics, using any of the methods, processes, and procedures discussed above with respect to FIG. 1, according to one embodiment. From block 210, the process proceeds to block 212.

At block 212, the analysis model 124 generates personalized assistance topic recommendation data by selecting the most relevant assistance topics in accordance with the time-based depreciation, using any of the methods, processes, and procedures discussed above with respect to FIG. 1, according to one embodiment. If the search results data are satisfactory, the process proceeds from block 212 to block 214.

At block 214, the user interface 114 outputs the personalized assistance topic recommendation data to the user in the current data management page, using any of the methods, processes, and procedures discussed above with respect to FIG. 1, according to one embodiment.

Those of skill in the art will recognize, in light of the present disclosure, that the process 200 can include different steps, and different orders of steps, than those represented in FIG. 2. For example, the analysis model 124 can generate the personalized assistance topic recommendation data based on the user contextual data including current and previous page data, the user attributes data, and the time-based depreciation data all-in-one analysis process rather than by successively revising the relevance of assistance topics. All such other processes fall within the scope of the present disclosure.

Figure 3:
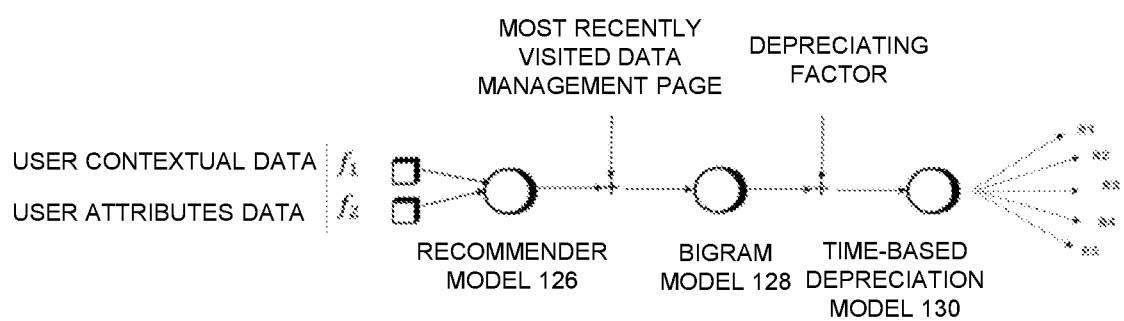
FIG. 3 illustrates a functional flow diagram of a process for accurately identifying the needs of users of a data management system, in accordance with one embodiment.

FIG. 3 illustrates a functional flow diagram of a process 300 for accurately identifying the needs of users of a data management system, in accordance with one embodiment.

Referring to FIG. 3, FIG. 2, FIG. 1, and the description of FIG. 1 and FIG. 2 above, the recommender model receives user contextual data and user attributes data, using any of the methods, processes, and procedures discussed above with respect to FIG. 1, according to one embodiment. The recommender model 126 generates initial assistance topics data 172 based on the user contextual data and the user attributes data. The bigram model 128 receives the initial assistance topics data 172 as well as additional contextual data indicating the most recently visited data management page, using any of the methods, processes, and procedures discussed above with respect to FIG. 1, according to one embodiment. The bigram model 128 generates revised assistance topics data 178 based on the initial assistance topics data 172, the current data management page, and the most recently visited data management page, using any of the methods, processes, and procedures discussed above with respect to FIG. 1, according to one embodiment. The time-based depreciation model 130 receives the revised assistance topics data 178 and generates time depreciated assistance topics data 184 by applying a depreciating factor to the revised assistance topics data 178, using any of the methods, processes, and procedures discussed above with respect to FIG. 1, according to one embodiment. The analysis model 124 outputs personalized assistance topic recommendation data 146 including the most highly rated assistance topics, e.g., R1-R5, corresponding to, or based on the time depreciated assistance topics data 184, using any of the methods, processes, and procedures discussed above with respect to FIG. 1, according to one embodiment.

Figure 4:
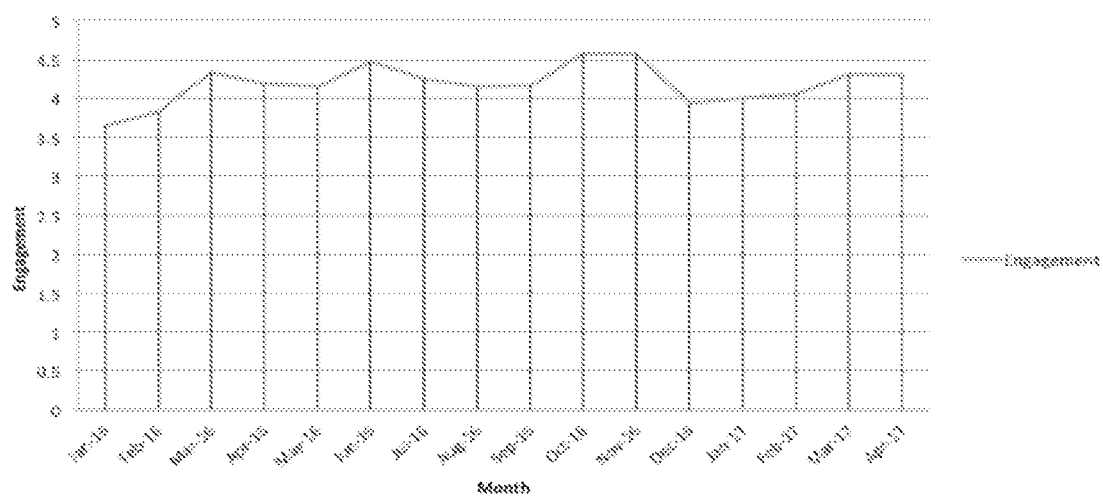
FIG. 4 is a graph indicating the engagement rate of users of a data management system with assistance topics, in accordance with one embodiment.

FIG. 4 includes a graph 400 indicating the engagement rate of users of a data management system with assistance topics, according to one embodiment. In the example of FIG. 4, the graph 400 indicates that the engagement rate, i.e., how often users select an assistance topic, peaks for every quarter. This kind of seasonality is captured in the time-based depreciation model 130. The time-based depreciation model penalizes past clicks for an assistance article by a depreciation factor. In one example, the depreciation factor is 0.85. Other depreciation factors can be used.

Figure 5:
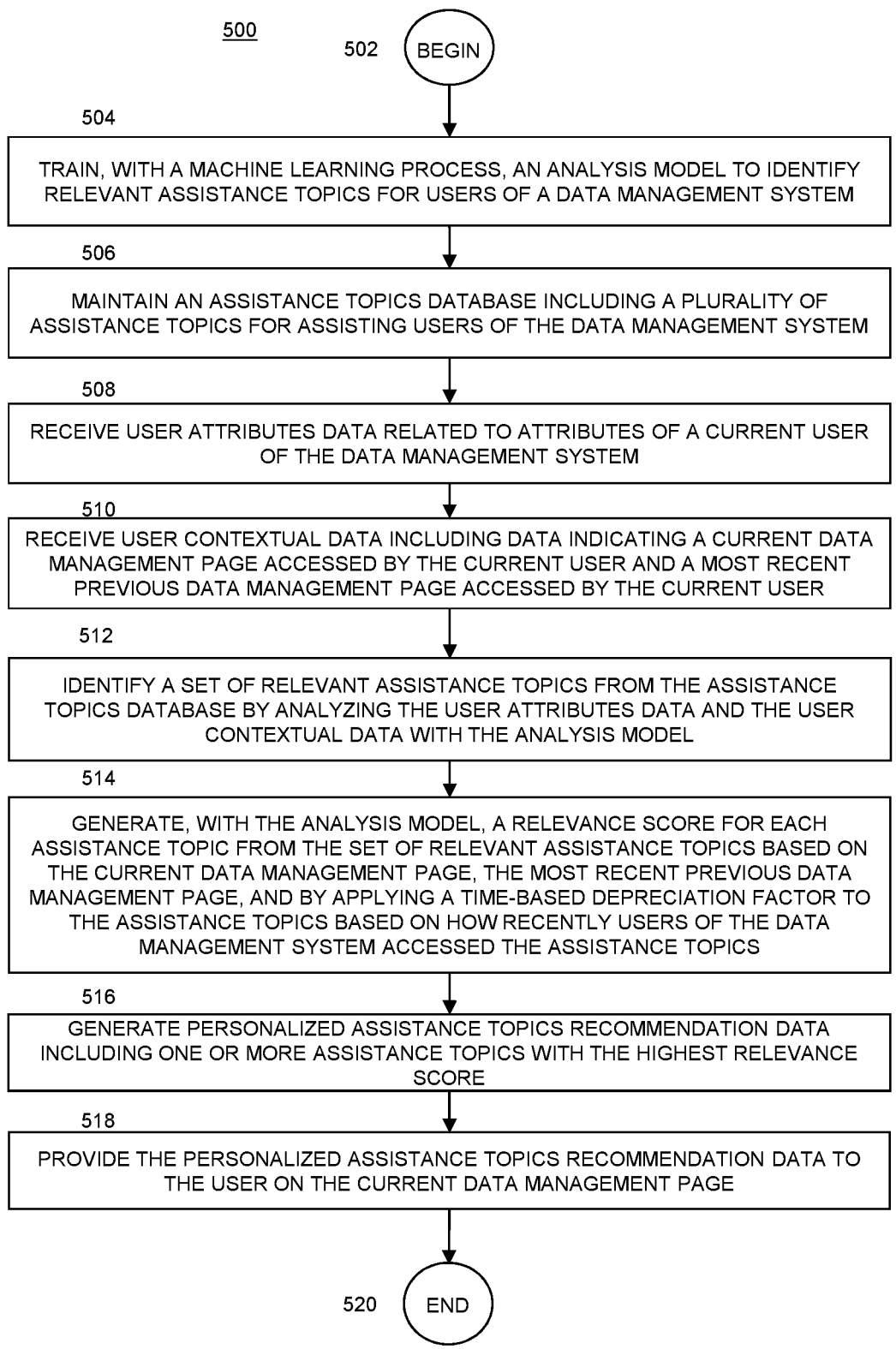
FIG. 5 is a flow diagram of a process for accurately identifying the needs of users of a data management system, in accordance with one embodiment.

FIG. 5 illustrates a flow diagram of a process 500 for accurately identifying the needs of users of a data management system, according to various embodiments.

Referring to FIGS. 1-3, and the description of FIGS. 1-2 above, in one embodiment, process 500 begins at BEGIN 502 and process flow proceeds to TRAIN, WITH A MACHINE LEARNING PROCESS, AN ANALYSIS MODEL TO IDENTIFY RELEVANT ASSISTANCE TOPICS FOR USERS OF A DATA MANAGEMENT SYSTEM 504.

In one embodiment, at TRAIN, WITH A MACHINE LEARNING PROCESS, AN ANALYSIS MODEL TO IDENTIFY RELEVANT ASSISTANCE TOPICS FOR USERS OF A DATA MANAGEMENT SYSTEM 504, an analysis model is trained, with a machine learning process, to identify relevant assistance topics for users of a data management system, using any of the methods, processes, and procedures discussed above with respect to FIGS. 1-2.

In one embodiment, once an analysis model is trained, with a machine learning process, to identify relevant assistance topics for users of a data management system at TRAIN, WITH A MACHINE LEARNING PROCESS, AN ANALYSIS MODEL TO IDENTIFY RELEVANT ASSISTANCE TOPICS FOR USERS OF A DATA MANAGEMENT SYSTEM 504, process flow proceeds to MAINTAIN AN ASSISTANCE TOPICS DATABASE INCLUDING A PLURALITY OF ASSISTANCE TOPICS FOR ASSISTING USERS OF THE DATA MANAGEMENT SYSTEM 506.

In one embodiment, at MAINTAIN AN ASSISTANCE TOPICS DATABASE INCLUDING A PLURALITY OF ASSISTANCE TOPICS FOR ASSISTING USERS OF THE DATA MANAGEMENT SYSTEM 506, an assistance topics database is maintained including a plurality of assistance topics for assisting users of the data management system, using any of the methods, processes, and procedures discussed above with respect to FIGS. 1-2.

In one embodiment, once an assistance topics database is maintained including a plurality of assistance topics for assisting users of the data management system at MAINTAIN AN ASSISTANCE TOPICS DATABASE INCLUDING A PLURALITY OF ASSISTANCE TOPICS FOR ASSISTING USERS OF THE DATA MANAGEMENT SYSTEM 506, process flow proceeds to RECEIVE USER ATTRIBUTES DATA RELATED TO ATTRIBUTES OF A CURRENT USER OF THE DATA MANAGEMENT SYSTEM 508.

In one embodiment, at RECEIVE USER ATTRIBUTES DATA RELATED TO ATTRIBUTES OF A CURRENT USER OF THE DATA MANAGEMENT SYSTEM 508, user attributes data related to attributes of a current user of the data management system is received, using any of the methods, processes, and procedures discussed above with respect to FIGS. 1-2.

In one embodiment, once user attributes data related to attributes of a current user of the data management system is received at RECEIVE USER ATTRIBUTES DATA RELATED TO ATTRIBUTES OF A CURRENT USER OF THE DATA MANAGEMENT SYSTEM 508, process flow proceeds to RECEIVE USER CONTEXTUAL DATA INCLUDING DATA INDICATING A CURRENT DATA MANAGEMENT PAGE ACCESSED BY THE CURRENT USER AND A MOST RECENT PREVIOUS DATA MANAGEMENT PAGE ACCESSED BY THE CURRENT USER 510.

In one embodiment, at RECEIVE USER CONTEXTUAL DATA INCLUDING DATA INDICATING A CURRENT DATA MANAGEMENT PAGE ACCESSED BY THE CURRENT USER AND A MOST RECENT PREVIOUS DATA MANAGEMENT PAGE ACCESSED BY THE CURRENT USER 510, user contextual data is received including data indicating a current data management page accessed by the current user and a most recent previous data access page accessed by the current user, using any of the methods, processes, and procedures discussed above with respect to FIGS. 1-2.

In one embodiment, once user contextual data is received including data indicating a current data management page accessed by the current user and a most recent previous data access page accessed by the current user at RECEIVE USER CONTEXTUAL DATA INCLUDING DATA INDICATING A CURRENT DATA MANAGEMENT PAGE ACCESSED BY THE CURRENT USER AND A MOST RECENT PREVIOUS DATA MANAGEMENT PAGE ACCESSED BY THE CURRENT USER 510, process flow proceeds to IDENTIFY A SET OF RELEVANT ASSISTANCE TOPICS FROM THE ASSISTANCE TOPICS DATABASE BY ANALYZING THE USER ATTRIBUTES DATA AND THE USER CONTEXTUAL DATA WITH THE ANALYSIS MODEL 512.

In one embodiment, at IDENTIFY A SET OF RELEVANT ASSISTANCE TOPICS FROM THE ASSISTANCE TOPICS DATABASE BY ANALYZING THE USER ATTRIBUTES DATA AND THE USER CONTEXTUAL DATA WITH THE ANALYSIS MODEL 512, a set of relevant assistance topics is identified from the assistance topics database by analyzing the user attributes data and the user contextual data with the analysis model, using any of the methods, processes, and procedures discussed above with respect to FIGS. 1-2.

In one embodiment, once a set of relevant assistance topics is identified from the assistance topics database by analyzing the user attributes data and the user contextual data with the analysis model at IDENTIFY A SET OF RELEVANT ASSISTANCE TOPICS FROM THE ASSISTANCE TOPICS DATABASE BY ANALYZING THE USER ATTRIBUTES DATA AND THE USER CONTEXTUAL DATA WITH THE ANALYSIS MODEL 512, process flow proceeds to GENERATE, WITH THE ANALYSIS MODEL, A RELEVANCE SCORE FOR EACH ASSISTANCE TOPIC FROM THE SET OF RELEVANT ASSISTANCE TOPICS BASED ON THE CURRENT DATA MANAGEMENT PAGE, THE MOST RECENT PREVIOUS DATA MANAGEMENT PAGE, AND BY APPLYING A TIME-BASED DEPRECIATION FACTOR TO THE ASSISTANCE TOPICS BASED ON HOW RECENTLY USERS OF THE DATA MANAGEMENT SYSTEM ACCESSED THE ASSISTANCE TOPICS 514.

In one embodiment, at GENERATE, WITH THE ANALYSIS MODEL, A RELEVANCE SCORE FOR EACH ASSISTANCE TOPIC FROM THE SET OF RELEVANT ASSISTANCE TOPICS BASED ON THE CURRENT DATA MANAGEMENT PAGE, THE MOST RECENT PREVIOUS DATA MANAGEMENT PAGE, AND BY APPLYING A TIME-BASED DEPRECIATION FACTOR TO THE ASSISTANCE TOPICS BASED ON HOW RECENTLY USERS OF THE DATA MANAGEMENT SYSTEM ACCESSED THE ASSISTANCE TOPICS 514, a relevance score is generated, with the analysis model, for each assistance topic from the set of relevant assistance topics based on the current data management page, the most recent previous data management page, and by applying a time-based depreciation factor to the assistance topics based on how recently users of the data management system accessed the assistance topics, using any of the methods, processes, and procedures discussed above with respect to FIGS. 1-2.

In one embodiment, once a relevance score is generated, with the analysis model, for each assistance topic from the set of relevant assistance topics based on the current data management page, the most recent previous data management page, and by applying a time-based depreciation factor to the assistance topics based on how recently users of the data management system accessed the assistance topics at GENERATE, WITH THE ANALYSIS MODEL, A RELEVANCE SCORE FOR EACH ASSISTANCE TOPIC FROM THE SET OF RELEVANT ASSISTANCE TOPICS BASED ON THE CURRENT DATA MANAGEMENT PAGE, THE MOST RECENT PREVIOUS DATA MANAGEMENT PAGE, AND BY APPLYING A TIME-BASED DEPRECIATION FACTOR TO THE ASSISTANCE TOPICS BASED ON HOW RECENTLY USERS OF THE DATA MANAGEMENT SYSTEM ACCESSED THE ASSISTANCE TOPICS 514, process flow proceeds to GENERATE PERSONALIZED ASSISTANCE TOPICS RECOMMENDATION DATA INCLUDING ONE OR MORE ASSISTANCE TOPICS WITH THE HIGHEST RELEVANCE SCORE 516.

In one embodiment, at GENERATE PERSONALIZED ASSISTANCE TOPICS RECOMMENDATION DATA INCLUDING ONE OR MORE ASSISTANCE TOPICS WITH THE HIGHEST RELEVANCE SCORE 516, personalized assistance topics recommendation data is generated including one or more assistance topics with the highest relevance score, using any of the methods, processes, and procedures discussed above with respect to FIGS. 1-2.

In one embodiment, once personalized assistance topics recommendation data is generated including one or more assistance topics with the highest relevance score at GENERATE PERSONALIZED ASSISTANCE TOPICS RECOMMENDATION DATA INCLUDING ONE OR MORE ASSISTANCE TOPICS WITH THE HIGHEST RELEVANCE SCORE 516, process flow proceeds to PROVIDE THE PERSONALIZED ASSISTANCE TOPICS RECOMMENDATION DATA TO THE USER ON THE CURRENT DATA MANAGEMENT PAGE 518.

In one embodiment, at PROVIDE THE PERSONALIZED ASSISTANCE TOPICS RECOMMENDATION DATA TO THE USER ON THE CURRENT DATA MANAGEMENT PAGE 518, the personalized assistance topics recommendation data is provided to the user on the current data management page, using any of the methods, processes, and procedures discussed above with respect to FIGS. 1-2.

In one embodiment, once the personalized assistance topics recommendation data is provided to the user on the current data management page at PROVIDE THE PERSONALIZED ASSISTANCE TOPICS RECOMMENDATION DATA TO THE USER ON THE CURRENT DATA MANAGEMENT PAGE 518, process flow proceeds to END 520.

In one embodiment, at END 520, the process for accurately identifying the needs of users of a data management system is exited to await new data and/or instructions.

Figure 6:
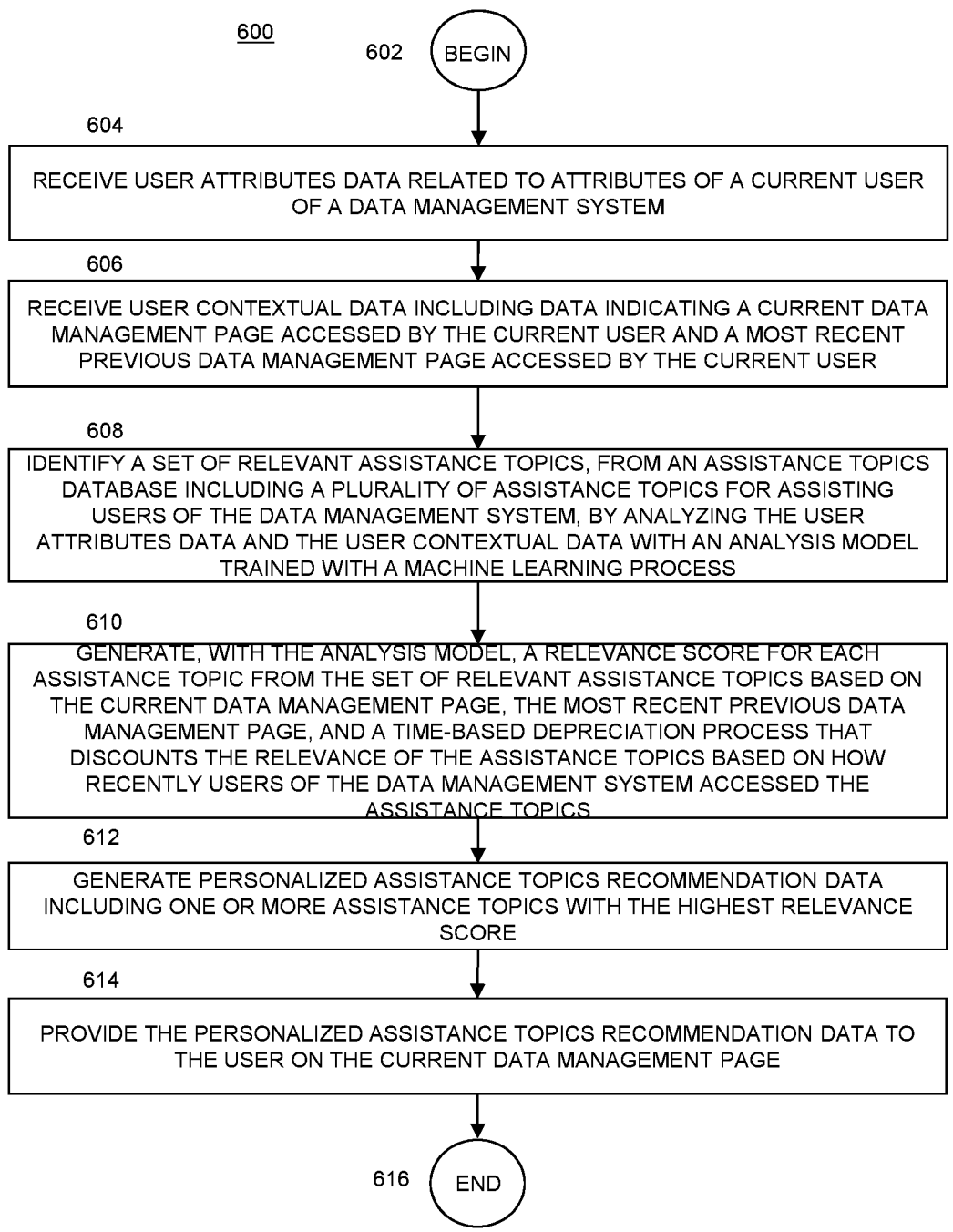
FIG. 6 is a flow diagram of a process for accurately identifying the needs of users of a data management system, in accordance with one embodiment.

FIG. 6 illustrates a flow diagram of a process 600 for accurately identifying the needs of users of a data management system, according to various embodiments.

Referring to FIG. 6, FIGS. 1-2, and the description of FIGS. 1-2 above, in one embodiment, process 600 begins at BEGIN 602 and process flow proceeds to RECEIVE USER ATTRIBUTES DATA RELATED TO ATTRIBUTES OF A CURRENT USER OF A DATA MANAGEMENT SYSTEM 604.

In one embodiment, at RECEIVE USER ATTRIBUTES DATA RELATED TO ATTRIBUTES OF A CURRENT USER OF A DATA MANAGEMENT SYSTEM 604, user attributes data related to attributes of a current user of a data management system is received, using any of the methods, processes, and procedures discussed above with respect to FIGS. 1-2.

In one embodiment, once user attributes data related to attributes of a current user of a data management system is received at RECEIVE USER ATTRIBUTES DATA RELATED TO ATTRIBUTES OF A CURRENT USER OF A DATA MANAGEMENT SYSTEM 604, process flow proceeds to RECEIVE USER CONTEXTUAL DATA INCLUDING DATA INDICATING A CURRENT DATA MANAGEMENT PAGE ACCESSED BY THE CURRENT USER AND A MOST RECENT PREVIOUS DATA MANAGEMENT PAGE ACCESSED BY THE CURRENT USER 606.

In one embodiment, at RECEIVE USER CONTEXTUAL DATA INCLUDING DATA INDICATING A CURRENT DATA MANAGEMENT PAGE ACCESSED BY THE CURRENT USER AND A MOST RECENT PREVIOUS DATA MANAGEMENT PAGE ACCESSED BY THE CURRENT USER 606, user contextual data is received including data indicating a current data management page accessed by the current user and a most recent previous data access page accessed by the current user, using any of the methods, processes, and procedures discussed above with respect to FIGS. 1-2.

In one embodiment, once user contextual data is received including data indicating a current data management page accessed by the current user and a most recent previous data access page accessed by the current user at RECEIVE USER CONTEXTUAL DATA INCLUDING DATA INDICATING A CURRENT DATA MANAGEMENT PAGE ACCESSED BY THE CURRENT USER AND A MOST RECENT PREVIOUS DATA MANAGEMENT PAGE ACCESSED BY THE CURRENT USER 606, process flow proceeds to IDENTIFY A SET OF RELEVANT ASSISTANCE TOPICS, FROM AN ASSISTANCE TOPICS DATABASE INCLUDING A PLURALITY OF ASSISTANCE TOPICS FOR ASSISTING USERS OF THE DATA MANAGEMENT SYSTEM, BY ANALYZING THE USER ATTRIBUTES DATA AND THE USER CONTEXTUAL DATA WITH AN ANALYSIS MODEL TRAINED WITH A MACHINE LEARNING PROCESS 608.

In one embodiment, at IDENTIFY A SET OF RELEVANT ASSISTANCE TOPICS, FROM AN ASSISTANCE TOPICS DATABASE INCLUDING A PLURALITY OF ASSISTANCE TOPICS FOR ASSISTING USERS OF THE DATA MANAGEMENT SYSTEM, BY ANALYZING THE USER ATTRIBUTES DATA AND THE USER CONTEXTUAL DATA WITH AN ANALYSIS MODEL TRAINED WITH A MACHINE LEARNING PROCESS 608, a set of relevant assistance topics is identified, from an assistance topics database including a plurality of assistance topics for assisting users of the data management system, by analyzing the user attributes data and the user contextual data with an analysis model trained with a machine learning process, using any of the methods, processes, and procedures discussed above with respect to FIGS. 1-2.

In one embodiment, once a set of relevant assistance topics is identified, from an assistance topics database including a plurality of assistance topics for assisting users of the data management system, by analyzing the user attributes data and the user contextual data with an analysis model trained with a machine learning process at IDENTIFY A SET OF RELEVANT ASSISTANCE TOPICS, FROM AN ASSISTANCE TOPICS DATABASE INCLUDING A PLURALITY OF ASSISTANCE TOPICS FOR ASSISTING USERS OF THE DATA MANAGEMENT SYSTEM, BY ANALYZING THE USER ATTRIBUTES DATA AND THE USER CONTEXTUAL DATA WITH AN ANALYSIS MODEL TRAINED WITH A MACHINE LEARNING PROCESS 608, process flow proceeds to GENERATE, WITH THE ANALYSIS MODEL, A RELEVANCE SCORE FOR EACH ASSISTANCE TOPIC FROM THE SET OF RELEVANT ASSISTANCE TOPICS BASED ON THE CURRENT DATA MANAGEMENT PAGE, THE MOST RECENT PREVIOUS DATA MANAGEMENT PAGE, AND A TIME-BASED DEPRECIATION PROCESS THAT DISCOUNTS THE RELEVANCE OF THE ASSISTANCE TOPICS BASED ON HOW RECENTLY USERS OF THE DATA MANAGEMENT SYSTEM ACCESSED THE ASSISTANCE TOPICS 610.

In one embodiment, at GENERATE, WITH THE ANALYSIS MODEL, A RELEVANCE SCORE FOR EACH ASSISTANCE TOPIC FROM THE SET OF RELEVANT ASSISTANCE TOPICS BASED ON THE CURRENT DATA MANAGEMENT PAGE, THE MOST RECENT PREVIOUS DATA MANAGEMENT PAGE, AND A TIME-BASED DEPRECIATION PROCESS THAT DISCOUNTS THE RELEVANCE OF THE ASSISTANCE TOPICS BASED ON HOW RECENTLY USERS OF THE DATA MANAGEMENT SYSTEM ACCESSED THE ASSISTANCE TOPICS 610, a relevance score is generated with the analysis model, for each assistance topic from the set of relevant assistance topics based on the current data management page, the most recent previous data management page, and a time-based depreciation process that depreciates the relevance of the assistance topics based on how recently users of the data management system accessed the assistance topics, using any of the methods, processes, and procedures discussed above with respect to FIGS. 1-2.

In one embodiment, once a relevance score is generated with the analysis model, for each assistance topic from the set of relevant assistance topics based on the current data management page, the most recent previous data management page, and a time-based depreciation process that depreciates the relevance of the assistance topics based on how recently users of the data management system accessed the assistance topics at GENERATE, WITH THE ANALYSIS MODEL, A RELEVANCE SCORE FOR EACH ASSISTANCE TOPIC FROM THE SET OF RELEVANT ASSISTANCE TOPICS BASED ON THE CURRENT DATA MANAGEMENT PAGE, THE MOST RECENT PREVIOUS DATA MANAGEMENT PAGE, AND A TIME-BASED DEPRECIATION PROCESS THAT DISCOUNTS THE RELEVANCE OF THE ASSISTANCE TOPICS BASED ON HOW RECENTLY USERS OF THE DATA MANAGEMENT SYSTEM ACCESSED THE ASSISTANCE TOPICS 610, process flow proceeds to GENER- ATE PERSONALIZED ASSISTANCE TOPICS RECOMMENDATION DATA INCLUDING ONE OR MORE ASSISTANCE TOPICS WITH THE HIGHEST RELEVANCE SCORE 612.

In one embodiment, at GENERATE PERSONALIZED ASSISTANCE TOPICS RECOMMENDATION DATA INCLUDING ONE OR MORE ASSISTANCE TOPICS WITH THE HIGHEST RELEVANCE SCORE 612, personalized assistance topics recommendation data is generated including one or more assistance topics with the highest relevance score, using any of the methods, processes, and procedures discussed above with respect to FIGS. 1-2.

In one embodiment, once personalized assistance topics recommendation data is generated including one or more assistance topics with the highest relevance score at GENERATE PERSONALIZED ASSISTANCE TOPICS RECOMMENDATION DATA INCLUDING ONE OR MORE ASSISTANCE TOPICS WITH THE HIGHEST RELEVANCE SCORE 612, process flow proceeds to PROVIDE THE PERSONALIZED ASSISTANCE TOPICS RECOMMENDATION DATA TO THE USER ON THE CURRENT DATA MANAGEMENT PAGE 614.

In one embodiment, at PROVIDE THE PERSONALIZED ASSISTANCE TOPICS RECOMMENDATION DATA TO THE USER ON THE CURRENT DATA MANAGEMENT PAGE 614, the personalized assistance topics recommendation data is provided to the user on the current data management page, using any of the methods, processes, and procedures discussed above with respect to FIGS. 1-2.

In one embodiment, once the personalized assistance topics recommendation data is provided to the user on the current data management page at PROVIDE THE PERSONALIZED ASSISTANCE TOPICS RECOMMENDATION DATA TO THE USER ON THE CURRENT DATA MANAGEMENT PAGE 614, process flow proceeds to END 616.

In one embodiment, at END 616, the process for accurately identifying the needs of users of a data management system is exited to await new data and/or instructions.

As noted above, the specific illustrative examples discussed above are but illustrative examples of implementations of embodiments of the method or process for accurately identifying the needs of users of a data management system. Those of skill in the art will readily recognize that other implementations and embodiments are possible. Therefore, the discussion above should not be construed as a limitation on the claims provided below.

In one embodiment, a computing system implemented method accurately identifies the needs of users of a data management system and provides personalized assistance to the users. The method includes training, with a machine learning process, an analysis model to identify relevant assistance topics for users of a data management system maintaining an assistance topics database including a plurality of assistance topics for assisting users of the data management system, receiving user attributes data related to attributes of a current user of the data management system, and receiving user contextual data including data indicating a current data management page accessed by the current user and a most recent previous data access page accessed by the current user. The method includes identifying a set of relevant assistance topics from the assistance topics database by analyzing the user attributes data and the user contextual data with the analysis model and generating, with the analysis model, a relevance score for each assistance topic from the set of relevant assistance topics based on the current data management page, the most recent previous data management page, and by applying a time-based depreciation factor to the assistance topics based on how recently users of the data management system accessed the assistance topics. The method includes generating personalized assistance topics recommendation data including one or more assistance topics with the highest relevance score and providing the personalized assistance topics recommendation data to the user on the current data management page.

In one embodiment, a computing system implemented method accurately identifies the needs of users of a data management system and provides personalized assistance to the users. The method includes receiving user attributes data related to attributes of a current user of a data management system, receiving user contextual data including data indicating a current data management page accessed by the current user and a most recent previous data access page accessed by the current user, and identifying a set of relevant assistance topics, from an assistance topics database including a plurality of assistance topics for assisting users of the data management system, by analyzing the user attributes data and the user contextual data with an analysis model trained with a machine learning process. The method includes generating, with the analysis model, a relevance score for each assistance topic from the set of relevant assistance topics based on the current data management page, the most recent previous data management page, and a time-based depreciation process that depreciates the relevance of the assistance topics based on how recently users of the data management system accessed the assistance topics. The method includes generating personalized assistance topics recommendation data including one or more assistance topics with the highest relevance score and providing the personalized assistance topics recommendation data to the user on the current data management page.

In one embodiment, a system for accurately identifying the needs of users of a data management system includes at least one processor and at least one memory coupled to the at least one processor. The at least one memory has stored therein instructions which, when executed by any set of the one or more processors, perform a process. The process includes training, with a machine learning process, an analysis model to identify relevant assistance topics for users of a data management system maintaining an assistance topics database including a plurality of assistance topics for assisting users of the data management system, receiving user attributes data related to attributes of a current user of the data management system, and receiving user contextual data including data indicating a current data management page accessed by the current user and a most recent previous data access page accessed by the current user. The process includes identifying a set of relevant assistance topics from the assistance topics database by analyzing the user attributes data and the user contextual data with the analysis model and generating, with the analysis model, a relevance score for each assistance topic from the set of relevant assistance topics based on the current data management page, the most recent previous data management page, and by applying a time-based depreciation factor to the assistance topics based on how recently users of the data management system accessed the assistance topics. The process includes generating personalized assistance topics recommendation data including one or more assistance topics with the highest relevance score and providing the personalized assistance topics recommendation data to the user on the current data management page.

In one embodiment, a system for accurately identifying the needs of users of a data management system includes at least one processor and at least one memory coupled to the at least one processor. The at least one memory has stored therein instructions which, when executed by any set of the one or more processors, perform a process. The process includes receiving user attributes data related to attributes of a current user of a data management system, receiving user contextual data including data indicating a current data management page accessed by the current user and a most recent previous data access page accessed by the current user, and identifying a set of relevant assistance topics, from an assistance topics database including a plurality of assistance topics for assisting users of the data management system, by analyzing the user attributes data and the user contextual data with an analysis model trained with a machine learning process. The process includes generating, with the analysis model, a relevance score for each assistance topic from the set of relevant assistance topics based on the current data management page, the most recent previous data management page, and a time-based depreciation process that depreciates the relevance of the assistance topics based on how recently users of the data management system accessed the assistance topics. The process includes generating personalized assistance topics recommendation data including one or more assistance topics with the highest relevance score and providing the personalized assistance topics recommendation data to the user on the current data management page.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to: a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, SSL communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to: a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid-state drive, an electrically erasable programmable read-only memory (ROM) (EEPROM), an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

As used herein, the term query includes, but is not limited to a textual query provided by a user to a data management system and an audible spoken query provided by a user to a data management system. As used herein, the term query data includes, but is not limited to the data representing a textual query or an audible spoken query.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a system for identifying recommended topics, the method comprising:
   identifying one or more attributes of a system user;
   identifying a subset of topics relevant to the system user based on analyzing the one or more attributes of the system user using an analysis model trained with a machine learning process to identify relevant topics for system users based on historical user attributes;
   generating, for each respective topic of the subset of topics, using the trained analysis model, a relevance score for the respective topic based at least in part on a most recent system page previously accessed by the system user and a current system page accessed by the system user; and generating one or more recommended topics for the system user based on the relevance scores.

2. The method of claim 1, further comprising:
maintaining a topics database including a set of topics for assisting system users, wherein each topic of the subset of topics is included within the set of topics.

3. The method of claim 1, wherein identifying the subset of topics is further based on analyzing the most recent system page and the current system page using the trained analysis model.

4. The method of claim 1, wherein identifying the subset of topics is further based on analyzing clickstream data indicating system pages recently accessed by the system user.

5. The method of claim 1, wherein the one or more recommended topics include a set of highest scoring topics among the subset of topics having the highest relevance scores, the method further comprising:
providing the one or more recommended topics to the system user on the current system page.

6. The method of claim 1, wherein the one or more attributes of the system user include at least one of an industry code associated with the system user, a language of the system user, a country associated with the system user, or a length of time that the system user has been associated with the system.

7. The method of claim 1, wherein the analysis model includes at least one of a naïve Bayes model, a logistic regression model, a decision tree model, or a K nearest neighbors model.

8. The method of claim 1, wherein generating the relevance score is further based on a time-based depreciation factor indicating a recency with which other users have accessed the respective topic.

9. The method of claim 8, wherein the time-based depreciation factor depreciates the relevance score for the respective topic by a particular percentage for each of a plurality of time periods based on at least one of a geometric depreciation method, an arithmetic depreciation method, or a linear depreciation method.

10. The method of claim 1, further comprising:
training the analysis model based on the historical user attributes.

11. A system for identifying recommended topics, the system comprising:
one or more processors; and
at least one memory coupled to the one or more processors and storing instructions that, when executed by the one or more processors, cause the system to perform operations including:
identifying one or more attributes of a system user;
identifying a subset of topics relevant to the system user based on analyzing the one or more attributes of the system user using an analysis model trained with a machine learning process to identify relevant topics for system users based on historical user attributes;
generating, for each respective topic of the subset of topics, using the trained analysis model, a relevance score for the respective topic based at least in part on a most recent system page previously accessed by the system user and a current system page accessed by the system user; and
generating one or more recommended topics for the system user based on the relevance scores.

12. The system of claim 11, wherein execution of the instructions causes the system to perform operations further including:
maintaining a topics database including a set of topics for assisting system users, wherein each topic of the subset of topics is included within the set of topics.

13. The system of claim 11, wherein identifying the subset of topics is further based on analyzing the most recent system page and the current system page using the trained analysis model.

14. The system of claim 11, wherein identifying the subset of topics is further based on analyzing clickstream data indicating system pages recently accessed by the system user.

15. The system of claim 11, wherein the one or more recommended topics include a set of highest scoring topics among the subset of topics having the highest relevance scores, and wherein execution of the instructions causes the system to perform operations further including:
providing the one or more recommended topics to the system user on the current system page.

16. The system of claim 11, wherein the one or more attributes of the system user include at least one of an industry code associated with the system user, a language of the system user, a country associated with the system user, or a length of time that the system user has been associated with the system.

17. The system of claim 11, wherein the analysis model includes at least one of a naïve Bayes model, a logistic regression model, a decision tree model, or a K nearest neighbors model.

18. The system of claim 11, wherein generating the relevance score is further based on a time-based depreciation factor indicating a recency with which other users have accessed the respective topic.

19. The system of claim 18, wherein the time-based depreciation factor depreciates the relevance score for the respective topic by a particular percentage for each of a plurality of time periods based on at least one of a geometric depreciation method, an arithmetic depreciation method, or a linear depreciation method.

20. A non-transitory computer-readable medium storing instructions that, when executed by one or more processors of a system for identifying recommended topics, cause the system to perform operations including:
identifying one or more attributes of a system user;
identifying a subset of topics relevant to the system user based on analyzing the one or more attributes of the system user using an analysis model trained with a machine learning process to identify relevant topics for system users based on historical user attributes;
generating, for each respective topic of the subset of topics, using the trained analysis model, a relevance score for the respective topic based at least in part on a most recent system page previously accessed by the system user and a current system page accessed by the system user; and
generating one or more recommended topics for the system user based on the relevance scores.

* * * * *